March 31, 1953  A. L. KAPLAN  2,632,984
VALVE RESEATER
Filed April 29, 1950
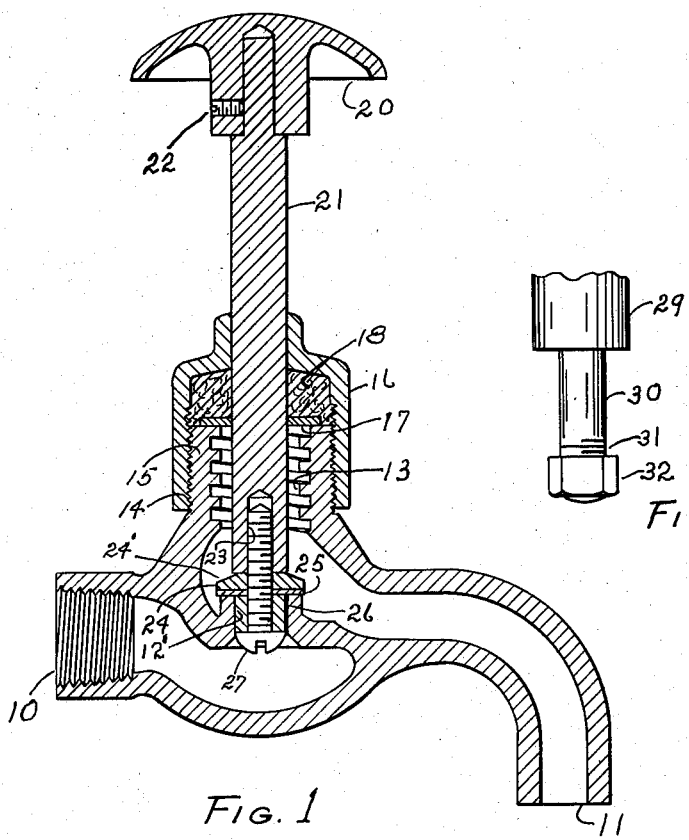
Fig. 1
Fig. 4
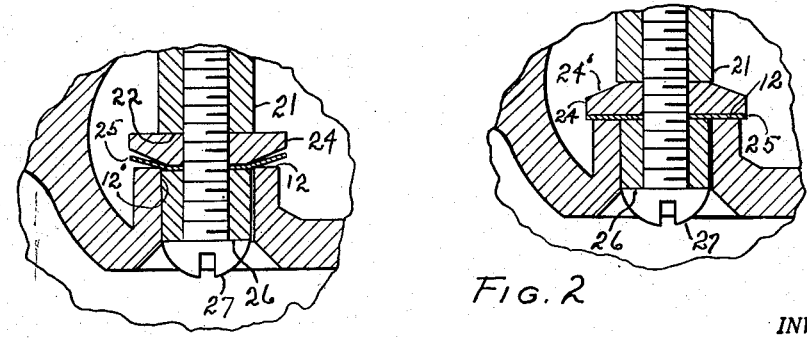
Fig. 3
Fig. 2
INVENTOR.
ABRAHAM L. KAPLAN
BY
ATTORNEY Patented Mar. 31, 1953

2,632,984

UNITED STATES PATENT OFFICE 2,632,984

VALVE RESEATER

Abraham L. Kaplan, Beloit, Wis.

Application April 29, 1950, Serial No. 159,029

1 Claim. (Cl. 51—241)

The present invention relates to a device for reseating valves on faucets and the like. The valves on such devices usually are supplied with a composition facing, nevertheless, the valve may give a lot of trouble from leakage partly caused by frequent lack of pressure of the valve on the seat.

It is not uncommon to find the seat of a faucet sprung out of alignment because of extreme physical pressure being inadvertently placed on the valve by the operator. Under such conditions extreme physical pressure may prevent leakage for a time because of the yielding characteristics of the seat, however this is an irksome task and sooner or later the valve will leak in spite of the additional pressure put on the valve.

Many different kinds of reseaters have been offered to the public none of which seem to be satisfactory because the standard metal cutting tool may chatter and for other reasons leaves an uneven or out of alignment seat, or too much material may be removed.

Applicant has evolved a very novel reseating device which will operate successfully and quickly in the hands of a person of ordinary intelligence and form a perfectly true seat in less time than conventional seaters require.

To these and other useful ends my invention consists of parts, combinations of parts or their equivalents and mode of operation as hereinafter described and claimed and shown in the accompanying drawing in which:

Fig. 1 is a vertical longitudinal sectional view through the center line of a conventional faucet with the valve removed and having attached thereto by improved reseater.

Fig. 2 is an enlarged view of my reseater head showing the seat of the faucet as illustrated in Figure 1 and illustrating the head adjusted for the primary reseating operation.

Fig. 3 is an enlarged view of the reseater head showing a fraction of the faucet and illustrating the head of the reseater adjusted for the second or finishing operation.

Fig. 4 illustrates a modification, somewhat enlarged.

To use my improved reseater, all that is necessary to do is to remove the valve and insert in its place my reseater as illustrated in Figure 1.

Figure 1 illustrates a conventional faucet having an inlet 10 and an outlet 11 with a valve seat as at 12, the seat having a machined inlet opening as at 12'. Conventional faucets are provided with a course internal thread 13, an external thread 14 on a vertical projection or stem 15, a cap 16, a washer 17 and a suitable yielding packing 18. The parts not shown in the drawings which form the remainder of the faucet consists of a valve on the lower end of a stem, the stem having course threads adapted to engage threads 13 and extending vertically through cap 16 with a handle on the upper end for opening and closing the valve. These parts are too well known to require illustrating and description. My improved reseater comprises parts as illustrated in Figure 1 which are very similar to the valve parts just described so as to fit into the space occupied by these valve parts.

The reseater comprises preferably a hand wheel 20 which is removably secured to the upper end of a stem 21 by means of a set screw 22, member 20 being preferably a correct shape to be conveniently gripped by one hand. The outer and upper surface of this wheel is slightly roughened for obvious reasons. Stem 21 is provided with a trued end 22 and an internal thread 23. A disc 24 having a beveled edge 24', and a sandpaper or emery cloth washer 25 are secured to the end of stem 21 by means of a collar 26 and a screw 27 as illustrated. Collar 26 is adapted to rotatably but snugly fit into opening 12'. Thus it will be seen by gripping hand piece 20 and turning it or oscillating it manually, member 25 will be held true and caused to true seat 12. In order to do a perfect job, I provide what I call a second operation wherein member 24 is turned over or reversed in its position as shown in Figure 3.

A few oscillations of hand wheel 25 with a slight pressure thereon will remove the sharp inner corner of the seat, whereby breaking the surface of the composition facing of the valve will be avoided, and a slight pressure on the handle of the valve will shut off the water and prevent drip leaking. It will be noted that the inner periphery of the tapered surface on disc 24 is somewhat smaller in diameter than valve opening 12' whereby member 25 which is quite flexible, will bend upward as shown in Figure 3, thus to lie across the inner corner of the valve seat.

I have shown the preferred form of my reseater particularly the manner of holding the device in operating position for reseating, and the manner of turning stem 21. Clearly handle 20 may be removed and a hand drill used for operating the stem.

Figure 4 illustrates a modification wherein screw 27 is dispensed with and stem 29 has integrally formed thereon an extension 30 which is threaded as at 31 suitable for the reception of a nut 32. The operation of members 24, 25 and 26 when mounted on member 29 is exactly the same as the operation of the head shown in Figures 1, 2 and 3.

It will be understood that minor changes may be made particularly in the manner of holding the reseater stem into position without departing from the spirit and scope of my invention as recited in the appended claim, for example, stems 21 or 29 may be held in alignment with the valve seat as shown. However, other means may be provided for this purpose.

Having thus shown and described my invention, I claim:

A valve reseater having, in combination, a rotary stem adapted to be received in a valve body and rotatably supported in alinement with an annular seat to be resurfaced around a valve port, a rigid washer having a flat end surface abutting against the inner end of said stem, the opposite end surface being generally frustro-conical and converging outwardly to overlap the inner peripheral edge of said valve seat, a flat disk of abrasive coated material disposed beyond and abutting against said conical surface, a cylindrical guide abutting against the outer surface of said disk, and means including a threaded connection operable to clamp said guide, said disk, and said washer together and against the inner end of said stem and to hold the same in coaxial alinement, said abrasive disk being flexible and adaptable to the contour of said conical backing surface.

ABRAHAM L. KAPLAN.

REFERENCES CITED

The following references are of record in the file of this patent:

UNITED STATES PATENTS

| Number | Name | Date |
| --- | --- | --- |
| 278,478 | Wright et al. | May 29, 1883 |
| 502,932 | Parsells | Aug. 8, 1893 |
| 1,292,372 | Reisch et al. | Jan. 21, 1919 |
| 1,361,134 | Branning | Dec. 7, 1920 |
| 1,871,228 | Stout et al. | Aug. 9, 1932 |
| 2,106,201 | Aab | Jan. 25, 1938 |